(12) United States Patent
Dick et al.

(10) Patent No.: US 7,585,430 B2
(45) Date of Patent: *Sep. 8, 2009

(54) PLATE-SHAPED PRESSED BODIES

(75) Inventors: Stefan O. Dick, Weichering (DE);
Arthur E. Schepf, Belen, NM (US);
Tateshi Kimura, Louisville, KY (US);
Andrew J. Robertson, Albuquerque, NM (US); Mike Gaffney, Belen, NM (US)

(73) Assignee: Sud-Chemie AG, Munich (DE)

( * ) Notice: Subject to any disclaimer, the term of this patent is extended or adjusted under 35 U.S.C. 154(b) by 489 days.

This patent is subject to a terminal disclaimer.

(21) Appl. No.: 11/386,175

(22) Filed: Mar. 22, 2006
(Under 37 CFR 1.47)

(65) Prior Publication Data

US 2007/0001146 A1    Jan. 4, 2007

Related U.S. Application Data

(63) Continuation of application No. 10/040,794, filed on Jan. 7, 2002, now abandoned.

(60) Provisional application No. 60/260,282, filed on Jan. 8, 2001.

(51) Int. Cl.
*H01J 35/20* (2006.01)

(52) U.S. Cl. ............... 252/181.1; 252/181.6; 252/189; 252/192

(58) Field of Classification Search ............ 252/181.1, 252/181.6, 189, 192
See application file for complete search history.

(56) References Cited

U.S. PATENT DOCUMENTS

| | | | |
|---|---|---|---|
| 4,146,277 A | 3/1979 | Santoro | |
| 4,360,444 A | 11/1982 | Esterl | |
| 5,591,379 A | 1/1997 | Shores | |
| 5,882,761 A | 3/1999 | Kawami | |
| 7,135,127 B2 * | 11/2006 | Dick | ............ 252/181.1 |
| 2003/0015687 A1 | 1/2003 | Dick | |

FOREIGN PATENT DOCUMENTS

| | | |
|---|---|---|
| DE | 3711156 | 10/1988 |
| EP | 0500382 | 8/1992 |
| EP | 0604860 | 7/1994 |
| EP | 0716140 | 6/1996 |
| JP | 46032572 | 9/1971 |
| JP | 55104913 | 8/1980 |
| JP | 55165144 | 12/1980 |
| JP | 56063818 | 5/1981 |
| JP | 60129139 | 7/1985 |
| JP | 60132643 | 7/1985 |
| JP | 61155216 | 7/1986 |
| JP | 63218234 | 9/1988 |
| JP | 2144121 | 6/1990 |
| JP | 06039235 | 2/1994 |
| WO | WO 0144107 | 6/2001 |

\* cited by examiner

*Primary Examiner*—Edward J Cain
(74) *Attorney, Agent, or Firm*—Scott R. Cox

(57) ABSTRACT

There is disclosed a plate-shaped pressed body (wafer) produced from an inorganic sorbent and a binder, having a thickness of less than 700 μm, which is produced by the process of compressing a mixture of the inorganic sorbent, the binder, and optionally water and compression aids at a pressure of at least 70 MPa, wherein the weight ratio of dry sorbent to dry binder is between about 4 and 0.7 and the water content of the mixture, measured at 160° C., is between 8 and 20%; and calcining the resulting pressed body at temperatures of at least about 500° C., until the water content is substantially removed.

24 Claims, 1 Drawing Sheet

PLATE-SHAPED PRESSED BODIES

RELATED APPLICATIONS

This application is a continuation application of application Ser. No. 10/040,794, filed on Jan. 7, 2002 now abandoned, which claims the benefit of U.S. Provisional Application No. 60/260,282, filed on Jan. 8, 2001.

FIELD OF INVENTION

The invention relates to plate-shaped pressed bodies (wafers) prepared from an inorganic sorbent and a binder, having a thickness of less than 700 μm, which are characterized by a high mechanical strength and a low brittleness and which are capable of effectively absorbing inorganic and organic gases or vapors.

BACKGROUND OF INVENTION

The manufacture of pressed bodies, in particular of tablets, on the basis of zeolites and binders is known. Thus, according to JP-A-61 15 5216, zeolite tablets are prepared by mixing a zeolite, a binder and a lubricant, and extruding the mixture. These are tablets with the same dimensions in all directions.

From JP-A-56 06 3818 the manufacture of zeolite tablets for use as gas-adsorbents is known. Powdered and dried (at 105 to 110° C.) zeolite is mixed with 8.1% by weight of bentonite powder and the mixture is kneaded with a 4% aqueous urea solution. The mixture is then tabletted, dried and calcined at 510° C. The increase of the compressive strength of the tablet is caused by the urea content.

From JP-A-55 16 5144 it is known to knead zeolite powder for cooling aggregates in powder form with bentonite and water. The mixture is extruded to form round particles with a diameter of 0.8 to 10 μm.

According to JP-A-55 10 4913, zeolite in the Na-form is mixed with 25% by weight clay, kneaded with water, extruded, calcined at 650° C., immersed in a calcium chloride solution, washed, dried at 110° C. and activated at 400° C. The tablets are used as drying agents.

According to JP-A-46 03 2572, zeolite powder is mixed with kaolin and Na- (or NH4-)-hydroxyethyl cellulose, shaped, dried and calcined at 650° C., in order to increase the strength of the zeolite tablets.

According to JP-A-21 44 121, deodorants are obtained by extruding zeolite powder or granules with calcium chloride or bentonite and water. The mixture is then tabletted and calcined.

According to JP-A-63 21 8234, drying agents are prepared by extruding a mixture of microporous particles (e.g. gypsum, cement, ceramic powder) and an inorganic or organic filler, such as CaCl2, LiCl, Bentonite, zeolites, PVA or other water-soluble polymers. The mixture is tabletted and subsequently hardened.

According to JP-A-60 132 643, zeolite tablets are prepared as drying agents using 20% sepiolite as a binder. The mixture is kneaded with water, tabletted, dried at 150° C. and calcined at 550° C. The tablets have an improved drying efficiency as compared to bentonite tablets.

The prior art tablets are unsuitable for utilization in a narrow space and under mechanical-stresses, because they are too thick and too heavy and have too low a sorption capacity for noxious gases and vapors (based on mass and surface). With the methods and mixtures according to the prior art, brittle pressed bodies were obtained which crumble, in particular after calcining.

It is known that electroluminescent devices function over a long period of time only if a drying agent is present. Such drying agents are required because of the sensitivity of the electrodes, in particular the cathodes, to moisture (cathodes generally consist of Ca or Mg alloys). Therefore in use, these devices are sealed as efficiently as possible under a protective gas.

The use of a moisture absorber in an electroluminescent device is disclosed in EP 500 382 A2. The moisture absorber is in the form of a powder or small spheres applied to a black silicone resin coating. According to the preferred embodiment, the drying agent is contained in a gas-permeable bag.

Likewise, U.S. Pat. No. 5,882,761 discloses the use of a drying agent in an electroluminescent device. The preferred drying agent is BaO. See also U.S. Pat. No. 5,591,379 which discloses a coating for use with microelectronic devices comprising a desiccant powder blended with a binder.

The sorbents known from the above-mentioned documents have the disadvantage that they can only absorb water vapor. The cathodes, however, can be degraded by other gases as well, which gases can be formed when the epoxy resin used for sealing is cured (ammonia, liquid amines). In addition, the presence of oxygen may result in a failure of the luminescent elements (oxidation of the cathode).

The present invention is based on the need to provide plate-shaped pressed bodies (wafers) comprising or formed from an inorganic sorbent and an inorganic binder which are very thin (less than 700 μm). In spite of being thin, these bodies have high strength and may be incorporated in particular into electronic elements which only have limited space available. These bodies are also shock resistant for uses such as electronic displays in automobiles and mobile telephones.

The present invention satisfies this need by providing plate-shaped pressed bodies (wafers) comprising or formed from an inorganic sorbent and a binder, having a thickness of less than 700 μm, which are obtainable by a process comprising the steps of compressing a mixture comprised of at least one inorganic sorbent, at least one binder and optionally water and a compression aid, at a pressure of at least 70 MPa; wherein the mixture has a weight ratio of dry sorbent to dry binder between about 4 and 0.7 and a water content of the mixture, measured at 160° C., between about 8 and 20%; and calcining the resulting pressed bodies at temperatures of at least 500° C., until the water content is substantially removed.

DETAILED DESCRIPTION

Figure 1:
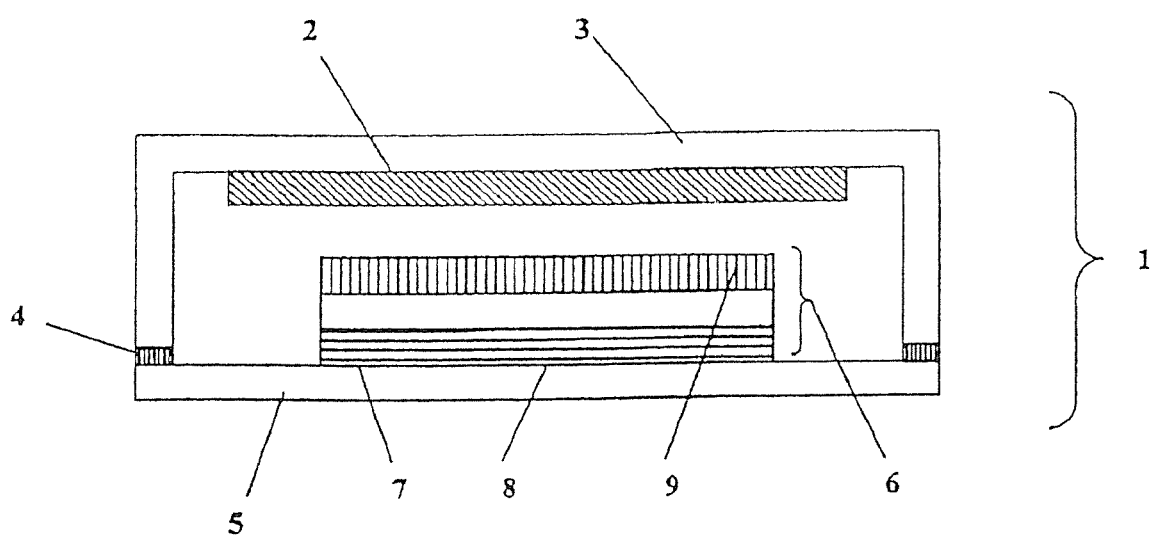
FIG. 1 is a side view of an electroluminescent product containing a plate shaped body of Example 4 as discussed in Example 13.

The pressed bodies (wafers) according to the invention have a high strength, a low brittleness, a high sorption rate and high sorption capacities with a low mass. They exhibit low thermal expansion, are not abraded and may be easily colored by the addition of pigments during manufacture.

The pressed bodies according to the invention may be produced in automatic processes in large numbers per unit time. They may be easily handed and may, for instance, be removed from a storage container by so called "pick-and-place" machines, and then inserted in an electronic device.

The pressed bodies according to the invention are capable of absorbing gases (ammonia, amines, oxygen) in addition to water vapor. Since they have a high sorption capacity, the electronic device into which they are to be inserted does not have to be completely sealed air-tight, i.e. the diffusion rate for water vapor into the device can be greater than zero. Moreover, the choice of a suitable material for sealing the device (e.g. an epoxy resin), is facilitated, as the critical time in which the said material used must have reached its final and lowest permeability for water vapor can be prolonged by the use of the wafer.

Preferably, the inorganic sorbent is a natural or synthetic zeolite. However, other sorbents, such as amorphous silica or aluminum hydroxide, or mixtures of two or more sorbents, may also be used.

In general, any binder which is known to a person skilled in the art may be used as the binder. Preferably, a smectite clay, especially bentonite, is used as the binder. Moreover, the use of other inorganic binders, such as aluminum oxide-hydroxide (pseudo-Boehmite), is permissible. Organic binders based on carbohydrates or proteins may also be used, for instance starch, cellulose derivatives (such as CMC or CEC), casein, as well as synthetic polymers, such as PVA, PVP or polyphenols or tannin-containing binders (quebracho). Also, mixtures of different binders may be used.

By the addition of the bentonite to the zeolite, the sorption capacity of the latter is surprisingly not reduced. In fact, a synergistic effect can be observed, i.e. the sorption of water vapor by the mixture is far less reduced than would be expected by mere calculation based on the percentages of the bentonite added to the composition.

The thickness of the wafers is preferably about 200 to 400 µm, its binder content is preferably about 40 to 50% by weight.

The invention also relates to a process for preparing the pressed bodies as defined above, which process is characterized in that a mixture comprised of or containing at least one inorganic sorbent, at least one binder and optionally water and compressing aids is compressed at a pressure of at least about 70 MPa, wherein in the mixture the weight ratio of dry sorbent to dry binder is between about 4 and 0.7 and the water content of the mixture, measured at 160° C., is between about 8 and 20%; and calcining the resulting pressed bodies at temperatures of at least about 500° C. until the water content is substantially removed.

It has been found that by this process results in particularly advantageous pressed bodies with excellent physical and chemical properties. Especially advantageous pressed bodies are obtained at a mixing ratio of dry sorbent to binder in the initial mixture between about 1.5 and 1.

The desired water content of the mixture may be adjusted via the water content of the components (sorbent, binder) and/or by addition of water.

The A-zeolite preferably used as a sorbent is available in powder form and has a moisture content of about 10 to 22%. The bentonite preferably used as a binder is available in powder form with a water content of about 10 to 20. The bentonite used has a montmorillonite content of preferably more than 80%, based on its dry weight. The preferred compression aids are fatty-acid salts of a divalent or trivalent metal, such as calcium, magnesium or aluminum stearate.

It has been found that the best results may be obtained during compression of the mixture to pressed bodies if the mixture does not comprise larger amounts, i.e. not more than about 15%, preferably not more than about 8%, in particular 0% of particles >250 µm, preferably >200 µm, and in particular >150 µm, and if the majority of the particles, i.e. at least 50%, preferably at least 60%, is larger than about 45 µm.

According to a preferred process, the zeolite and bentonite powders are mixed in the desired ratio with a sufficient amount of water to allow granulation of the mixture. Preferably, an intensive mixer is used herein. The amount of water which is added depends on the mixing ratio of zeolite and bentonite as well as the colloid chemical properties of the bentonite used and may be easily determined by an artisan. After granulation, the mixture is adjusted or dried, respectively, to a water content of about 8 to 20%, the water content being determined at 160° C. Subsequently, the mixture is comminuted to particle sizes <250 µm, preferably <200 µm, in particular <150 µm as indicated above.

It has been surprisingly found that when compressing the mixture to obtain pressed bodies, the best results may be obtained if the majority of the particles of the mixture have a more or less spherical form as may be obtained e.g. by spray drying. Therefore, according to a particularly preferred embodiment, zeolite and bentonite powder are slurried in water using a high-shear stirring device, such as a Ultra Turrax stirrer in order to obtain a pumpable slurry which is then spray-dried by conventional methods. The water content of the mixture may be adjusted to the preferred range between about 8 And 20% (the water content is determined at 160° C.) by controlling the spray-drying process. The adjustment of the particle size distribution so that the mixture, as defined above, does not contain large amounts of particles >250 µm, preferably >200 µm, and in particular >150 µm, and that the majority of the particles is larger than about 45 µm, may also be achieved by appropriate control of the spray-drying process and optionally subsequent deagglomeration, screening and sorting steps as known in the art.

The forming of the pressed bodies from the mixture is performed at a pressure of at least about 70 MPa. The preferred pressure is between 100 and 1300 MPa. The compression of the mixture can be performed in commercially available automatic presses, the construction of which is known to the artisan.

In order to allow an efficient production of the pressed bodies, it is important that the formed bodies separate easily and without residual matter from the compression tools. This can be achieved by appropriate choice of surface-modified tools (e.g. steel modified with TiN— or WC), and by ensuring precise control and adjustment of the water content of the mixture and control of temperature and humidity at the site of compression. At low water contents, it is advantageous to provide a relatively high humidity, e.g. 60 to 80% relative humidity at about 25 to 35° C. At high water contents, a relatively low absolute humidity is preferred, e.g. 30 to 50% relative humidity at about 20 to 30° C. According to another preferred embodiment anti-sticking agents, such as magnesium or calcium stearate, are applied to the pressure tools after a predetermined number of compression cycles, e.g. after each or each second cycle. Thus, the sticking of the pressed bodies to the compression tools can be effectively avoided.

The pressed bodies are calcined at about 500 to 900° C., preferably at about 650° C., until a constant weight is obtained and the water content is substantially removed.

Furthermore, it has been surprisingly found that the arching and bulging of the pressed bodies during calcination may be practically eliminated by the application of pressure to the pressed bodies during the calcination step.

According to a preferred embodiment, the application of pressure to the pressed bodies during calcination is provided by the use of a specially designed belt calcination device wherein the application of pressure to the pressed bodies is achieved via belts. In general, the application of pressure to the pressed bodies during calcination can be achieved by any method, as long as the pressure applied effectively suppresses the bulging (curving) of the pressed bodies during calcination and does not damage the pressed bodies. In general, a pressure between 10 and 30 000 Pa, in particular between 100 and 5.000 Pa, may be applied.

According to a further preferred embodiment, a certain quantity of pressed bodies is stacked in tubes, e.g. tubes made of stainless steel or ceramics. Preferably, the tubes are provided with openings (drilling holes) allowing for the evaporation of water during calcination. This ensures a rapid and uniform drying. The whole stack within a tube is subjected to a pressure sufficient to suppress bulging of the pressed bodies during calcination without causing fracture, sticking or sintering of the pressed bodies during this process step. In general, the pressure lies between about 10 and 30.000 Pa, preferably between 100 and 5,000 Pa. The wafers calcined under application of pressure according to the invention, are flat and show no or only a minimal curvature or bulging, which is a prerequisite for use in electroluminescent devices.

According to a further preferred embodiment the calcination temperature is increased stepwise in order to prevent the formation of fractures and cracks in the pressed bodies due to fast, non-uniform evaporation of water.

The pressed bodies may also be calcined under vacuum and cooled, whereby they are capable of sorbing permanent gases, such as oxygen.

Furthermore, the pressed bodies may contain coloring pigments, such as $Fe_3O_4$.

The invention further relates to the use of the above-defined pressed bodies as inserts in electronic devices or elements, such as displays, in particular electroluminescent elements, such as organic light-emitting diodes (LED). However, they may also be used in moisture-sensitive liquid crystal displays (LCD).

These devices or elements may be damaged by inorganic or organic gases or vapors during manufacture or during use. However, in view of their construction, they have only limited space available for a sorption agent.

These electronic devices or elements (e.g. displays in motor vehicles and mobile telephones) are frequently exposed to strong shocks. It is therefore important that the pressed bodies not break or crumble. In view of their strength, it is not necessary to cover the pressed bodies with a gas-permeable foil, which simplifies the manufacture of the electronic elements.

As compared to BaO, a significant volume and cost reduction of the electronic element may be achieved. Thus, the wafers (related to their mass) have a higher sorption capacity and sorption rate for water vapor within the required temperature and moisture range in an electronic element. In addition, when using Bao, it should be noted that an increase of the volume of the material by 100% occurs during the hydration reaction. Therefore, an additional volume for the expansion of the drying agent must be provided within the element, and a water-vapor permeable foil must be applied between the BaO and the electroluminescent layer to avoid contact between the expanding and possibly crumbling drying agent and the layer. In contrast, the wafers (according to the invention) do not show a change of volume when absorbing water, and remain mechanically stable. Therefore, the presence of an additional expansion volume with the element and the application of a protective foil are not necessary.

Bao has the additional disadvantage that it or its hydration products exhibit a strong basic reaction. Furthermore, there is a strong local heating when absorbing moisture. In direct contact with organic compounds it also has a tendency toward self-ignition. This limits the selection of polymers for the above-mentioned protecting foils to very expensive polymers, e.g. fluoropolymers, and thus increases the costs of the element. In addition, when using Bao, disposal problems arise because, being a hazardous chemical, the dismantling, re-use and disposal of the individual parts of the electronic elements are rendered difficult.

The pressed bodies according to the invention can also be used for other purposes, e.g. as inserts for pharmaceutical packages, because of the limited volume which is available within the package for the accommodation of a drying agent.

The pressed bodies may be present in any form, for instance they may be round, square, triangular or rectangular, and may include holes and/or voids. The pressed bodies according to the invention are dust-free and abrasion-resistant. They may be manufactured in common press automats in a very large number per unit time.

The invention is illustrated by the following examples:

EXAMPLE 1 (COMPARISON)

75.2 kg zeolite 4A (water content 20%), 23.8 kg bentonite (water content 12%) and 1 kg calcium stearate were mixed in an intensive mixer for 2 minutes. Water was added until there was a substantial increase in viscosity, and mixing was continued for 4 minutes. The mixture was dried to a water content of 12% at 110° C., and subsequently granulated (Stokes granulator) and sieved (250 μm). 0.22 g of the material with a particle size of <250 μm were pressed to a round wafer under a pressure of 69 MPa. The wafers were calcined at 650° C. for 3 hours, cooled with the exclusion of moisture and packed air-tight. The thickness of the wafers increased by about 15 to 25% upon calcination.

Product Properties:

| | |
|---|---|
| Thickness: | 300 ± 50 μm |
| Moisture content (after calcination): | <1% |
| Production rejects: | >90% |
| Dropping test*: | 100% fracture, wafer crumbles at the periphery |

*The measure for the compression strength is the so called dropping test, wherein 100 calcined pressed bodies (round discs with a diameter of 27 μm) are dropped from a height of 1 m with the flat side facing downwards. The percentage of the broken test bodies was determined.

EXAMPLE 2 (COMPARISON)

57 kg zeolite 4 A (water content 20%), 42 kg bentonite (water content 12%) and 1 kg calcium stearate were mixed in an intensive mixer for 2 minutes. Water was added until there was a substantial increase of viscosity, and mixing was continued for 4 minutes. The mixture was dried to a water content of 12% at 110° C., and subsequently granulated (Stokes granulator) and sieved (250 μm). 0.22 g of the material with a particle size of <250 μm were pressed to a wafer under a pressure of 69 MPa. The wafers were calcined at 650° C. for 3 hours, cooled with the exclusion of moisture and packed air-tight.

Product Properties:

| | |
|---|---|
| Thickness: | 300 ± 50 μm |
| Moisture content (after calcination): | <1% |
| Production rejects: | 75% |
| Dropping test: | 80% fracture |

EXAMPLE 3

57 kg zeolite 4A (water content 20%), 42 kg bentonite (water content 12%) and 1 kg calcium stearate were mixed in an intensive mixer for 2 minutes. Water was added until there is a strong increase of viscosity, and mixing was continued for 4 minutes. The mixture was dried to a water content of 12% at 110° C., and subsequently granulated (Stokes granulator) and sieved (250 μm). 0.22 g of the material with a particle size of <250 μm were pressed to a wafer under a pressure of 72 MPa. The wafers were treated as in Example 2.

Product Properties:

| | |
|---|---|
| Thickness: | 300 ± 50 μm |
| Moisture content (after calcination): | <1% |
| Production rejects: | <50% |
| Dropping test: | 609% fracture |

EXAMPLE 4

57 kg zeolite 4A (water content 20%), 42 kg bentonite, (water content 12%) and 1 kg calcium stearate were mixed in an intensive mixer for 2 minutes. Water was added until there is a substantial increase of viscosity, and mixing was continued for 4 minutes. The mixture was dried to a water content of 12% at 110° C., and subsequently granulated (Stokes granulator) and sieved (250 μm). 0.22 g of the material with a particle size of <250 μm were pressed to a wafer under a pressure of 350 MPa. The wafers were calcined at 650° C. for 3 hours, cooled with the exclusion of moisture and packed air-tight.

Product Properties:

| | |
|---|---|
| Thickness: | 300 ± 50 μm |
| Moisture content (after calcination): | <1% |
| Production rejects: | <25% |
| Dropping test: | 15% fracture |
| Sorption capacity* | |
| after 1 hour | 5.4% by weight |
| after 5 hours | 7.2% by weight |
| after 24 hours | 13.0% by weight |

*The sorption capacity for water vapor was determined at 25° C. in an atmosphere having a moisture content o 10%.

EXAMPLE 5

The procedure of Example 4 was repeated except that the calcination of the wafers was carried out in vacuum. The calcined wafers had essentially the same product properties as the wafers of Example 4, but they additionally showed a sorption capacity for oxygen of about 5 ml/g (determined in a dry oxygen atmosphere).

EXAMPLE 6

56.5 kg zeolite 4A (water content 20%), 41.5 kg bentonite (water content 12%), 1 kg calcium stearate and 1 kg quebracho were mixed in an intensive mixer for 2 minutes. Water was added until there was a substantial increase of viscosity, and mixing was continued for 4 minutes. The mixture was dried to a water content of 12% at 110° C., and subsequently granulated (Stokes granulator) and sieved (250 μm). 0.22 g of the material with a particle size of <250 μm were pressed to a wafer under a pressure of 200 MPa. The wafers were calcined at 650° C. for 3 hours, cooled with the exclusion of moisture and packed air-tight.

Product Properties:

| | |
|---|---|
| Thickness: | 300 ± 50 μm |
| Moisture content (after calcination): | <1% |
| Production rejects: | <35% |
| Dropping test: | 10% fracture |

EXAMPLE 7

The procedure of Example 4 was repeated except that the compression pressure was 1200 MPa. The dropping test yielded 10% fractures. The rejects were <10%.

EXAMPLE 8

The procedure of Example 4 was repeated except that 54 kg zeolite 4A, 40 kg bentonite, 5 kg Fe3O4 and 1 kg calcium stearate are used. The resulting wafers were dark in color and could be used for a contrast surface in a LED display.

EXAMPLE 9

110.5 kg zeolite 4A (water content 20%), 76.0 kg bentonite (water content 12%) and 1.9 kg calcium stearate were slurried in a high-shear stirring device in sufficient water to obtain a pumpable slurry. The slurry (suspension) was spray-dried so that a powder with a water content of 9.2% (determined by drying at 160° C.) and a particle size distribution of 0%>150 μm and 30%<45 μm was obtained. 0.17 g of this material are compressed to a wafer having a diameter of 20 mm using a pressure of 190 MPa, the partial pressure of water vapor in the environment (air) surrounding the compression tools set to about 30 mbar. The wafers were calcined under the application of pressure for 3 hours at 650° C. 300 wafers were stacked in stainless steel tubes with drilling holes (openings) (height 120 mm, inner diameter 20 mm), and the stack was subjected to a pressure of 2.550 Pa. Following calcination, the wafers were cooled under exclusion of moisture and packed.

Product Properties:

| | |
|---|---|
| Thickness: | 300 ± 50 μm |
| vertical dimension: (thickness + curvature (bulging)) | <350 μm |
| Moisture content (after calcination): | <1% |
| Production rejects: | <5% |
| Dropping test: | <1% |

EXAMPLE 10

110.5 kg zeolite 4A (water content 20%), 76.0 kg bentonite (water content 12%) and 1.9 kg calcium stearate were slurried in a high-shear stirring device (Ultra-Turrax stirrer) in sufficient water to obtain a pumpable slurry. The slurry (suspension) was spray-dried so that a powder with a water content of 12.6% (determined by drying at 160° C.) and a particle size distribution of O %>150 μm and 260%<45 μm was obtained. 0.17 g of this material was compressed to a wafer having a diameter of 20 mm using a pressure of 210 MPa, the partial pressure of water vapor in the environment (air) surrounding the compression tools was about 17 mbar. The wafers were calcined under the application of pressure for 3 hours at 650° C. Thus, 300 wafers were stacked in stainless steel tubes with drilling holes (openings) (height 120 mm, inner diameter 22 mm), and the stack was subjected to a pressure of 2.550 Pa. After calcination, the wafers were cooled under exclusion of moisture and packed.

Product Properties:

| | |
|---|---|
| Thickness: | 300 ± 50 μm |
| Vertical dimension: (thickness + curvature (bulging)) | <350 μm |
| Moisture content (after calcination): | <1% |
| Production rejects: | <5% |
| Dropping test: | <1% |

EXAMPLE 11

110.5 kg zeolite 4A (water content 20%), 76.0 kg bentonite (water content 12%) and 1.9 kg calcium stearate were slurried in a high-shear stirring device (Ultra-Turrax stirrer) in sufficient water to obtain a pumpable slurry. The slurry (suspension) was spray-dried so that a powder with a water content of 15.5% (determined by drying at 160° C.) and a particle size distribution of 4%>150 μm and 8%@<45 μm was obtained. 0.17 g of this material were compressed to a wafer having a diameter of 20 mm using a pressure of 195 MPa, the partial pressure of water vapor in the environment (air) surrounding the compression tools was set to about 12 mbar. The wafers were calcined under the application of pressure for 3 hours at 650° C. Thus, 300 wafers were stacked in stainless steel tubes with drilling holes (openings) (height 120 mm, inner diameter 22 mm), and the stack was subjected to a pressure of 2.550 Pa. After calcination, the wafers were cooled under exclusion of moisture and packed.

Product Properties:

| | |
|---|---|
| Thickness: | 300 ± 50 μm |
| vertical dimension: (thickness + curvature (bulging)) | <350 μm |
| Moisture content (after calcination): | <1% |
| Production rejects: | <5% |
| Dropping test: | <1% |

EXAMPLE 12

57 kg zeolite 4A (water content 20%), 42 kg of a 50/50 mixture of attapulgite and kaolin (water content 12%) and 1 kg calcium stearate were mixed for 2 minutes in an intensive mixer. Then, water was added until there was a substantial increase of viscosity, and mixing was continued for 4 minutes. The mixture was dried to a water content of 12%, and subsequently granulated and sieved (150 μm sieve). 0.17 g of this material having a particle size <150 μm were pressed to a wafer under a pressure of 200 MPa. The wafers were calcined for 3 hours at 650° C., cooled with the exclusion of moisture and packed.

Product Properties:

| | |
|---|---|
| Thickness: | 300 ± 50 μm |
| Moisture content (after calcination): | <1% |
| Production rejects: | 25% |
| Dropping test: | 70% fracture |

EXAMPLE 13

An organic electroluminescent element (1) (square, area 12.9 cm2), as shown in FIG. 1, was produced using a wafer (circular, diameter 27 μm) of Example 4. After fixing the wafer (2) to the back wall (3) of the element, it was adhered to the glass substrate (5) of the element by means of an adhesive (4) and it was sealed as far as possible by means of an adhesive. Then, a microphotograph (enlarged 50 times) of the light-emitting part (6) (consisting of the anode (7), the light-emitting layer (8) and the cathode (9) of the element was taken. This photograph does not show dark (non-luminescent) spots, which indicates an attack on cathode (9).

The element was exposed to a temperature of 85° C. and a relative humidity of 85% for 500 hours. Subsequently, a new microphotograph of the light-emitting part (6) of element (1) was taken. A comparison of the two photographs shows that no dark spots were formed, which indicates an attack on the cathode (9).

EXAMPLE 14 (COMPARISON)

An organic electroluminescent element (1) as in Example 9 was produced using BaO. As a cover for the BaO, a water-permeable teflon foil was used which was attached to the back wall (3) by means of a thin double-adhesive tape. The amount of BaO was adjusted so that the total mass of BaO, of the teflon foil and the double-adhesive tape exactly corresponds to that of the wafer produced in Example 9. Thereafter, as described in Example 9, enlarged photographs of the light-emitting element before and after a storage at 85° C. and 85% humidity for 500 hours were taken. A comparison of the two photographs showed a significantly recognizable growth of dark spots which indicated an attack on cathode (9).

The invention claimed is:

1. A plate-shaped pressed body with a thickness of less than about 700 μm, comprising an inorganic sorbent and a binder wherein the pressed body is obtained by the process comprising the steps of
    compressing a mixture comprised of the inorganic sorbent and the binder at a pressure of at least about 70 MPa, wherein the weight ratio of the sorbent to the binder in the mixture is between about 4:1 and 0.7:1 when measured on a dry weight basis and wherein the water content of the mixture determined at 160° C. is between about 8 and 20 percent, and
    calcining the resulting compressed mixture at a temperature of at least about 500° C. to form the pressed body, wherein water contained in the calcined pressed body is less than about 2 percent.

2. The pressed body of claim 1 wherein the mixture further comprises a compression aid.

3. The pressed body of claim 2 wherein the compression aid comprises a fatty acid salt of a divalent or trivalent metal.

4. The pressed body of claim 1 wherein the calcining is continued until the pressed body has a constant weight.

5. The pressed body of claim 1 wherein the calcining is continued until the residual moisture content of the pressed body is less than about 1 percent by weight.

6. The pressed body of claim 1 wherein the inorganic sorbent comprises a natural or synthetic zeolite.

7. The pressed body of claim 1 wherein the binder comprises a smectite clay.

8. The pressed body of claim 7 wherein the smectite clay comprises bentonite.

9. The pressed body of claim 1 wherein the pressed body has a thickness from about 200 to about 400 μm.

10. The pressed body of claim 1 wherein the ratio of the sorbent to the binder in the mixture on a dry weight basis is between 1.5 to 1 and 1 to 1.

11. The pressed body of claim 1 wherein the mixture of sorbent and binder are compressed at a pressure from about 100 to about 1300 MPa.

12. The pressed body of claim 1 wherein the mixture comprises particles, wherein not more than 15 percent of the particles are greater than about 250 μm in diameter.

13. The pressed body of claim 1 wherein the mixture comprises particles, wherein not more than 8 percent of the particles are greater than about 200 μm in diameter.

14. The pressed body of claim 1 wherein the mixture comprises particles, wherein not more than 8 percent of the particles are greater than about 150 μm in diameter.

15. The pressed body of claim 1 wherein the mixture comprises particles, wherein at least about 50 percent of the particles are greater than 45 μm in diameter.

16. The pressed body of claim 1 wherein the mixture comprises particles, wherein at least about 60 percent of the particles are greater than 45 μm in diameter.

17. The pressed body of claim 1 wherein the mixture comprises at least about 50 percent spherical particles.

18. The pressed body of claim 1 wherein the mixture comprises at least about 80 percent spherical particles.

19. The pressed body of claim 1 wherein the mixture comprises at least about 98 percent spherical particles.

20. The pressed body of claim 1 wherein the mixture is spray dried prior to compressing.

21. The pressed body of claim 1 wherein the compressed mixture is calcined under vacuum.

22. The pressed body of claim 1 wherein the pressed body is calcined under pressure in a perforated tube.

23. A process for producing pressed bodies comprising
mixing an inorganic sorbent and a binder to form a mixture and pressing said mixture at a pressure of at least about 70 MPa, wherein the weight ratio of the sorbent to the binder is between about 4:1 and about 0.7:1 and the water content of the mixture measured at 1500 is between about 8 and 20 percent, and calcining the pressed bodies at temperatures of about 500° C. until the water content is less than about 2 percent to form the pressed bodies.

24. A process for removing moisture from an electronic device by placing the pressed body of claim 1 within the electronic device.

* * * * *